US010057811B2

(12) United States Patent
Hassan et al.

(10) Patent No.: US 10,057,811 B2
(45) Date of Patent: Aug. 21, 2018

(54) HIERARCHICAL SPECTRUM OFFLOAD

(71) Applicant: Microsoft Technology Licensing, LLC, Redmond, WA (US)

(72) Inventors: Amer Hassan, Kirkland, WA (US); Mark Clear, Snohomish, WA (US); Peter Fortman, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 11 days.

(21) Appl. No.: 14/805,683

(22) Filed: Jul. 22, 2015

(65) Prior Publication Data

US 2017/0026874 A1 Jan. 26, 2017

(51) Int. Cl.
*H04B 7/26* (2006.01)
*H04W 28/08* (2009.01)
*H04W 72/06* (2009.01)
*H04W 72/04* (2009.01)
*H04W 72/08* (2009.01)

(52) U.S. Cl.
CPC ......... *H04W 28/085* (2013.01); *H04W 72/06* (2013.01); *H04W 72/0453* (2013.01); *H04W 72/08* (2013.01); *H04W 72/082* (2013.01)

(58) Field of Classification Search
None
See application file for complete search history.

(56) References Cited

U.S. PATENT DOCUMENTS 7,366,202 B2 4/2008 Scherzer et al.
8,442,440 B2 5/2013 Memik et al.
8,964,685 B2 2/2015 Smith et al.
(Continued)

FOREIGN PATENT DOCUMENTS

CN 102883345 A 1/2013
WO 2014140877 A3 3/2015

OTHER PUBLICATIONS

Wu, et al., "Hierarchical Architectures in the Third-Generation Cellular Network", In Journal of IEEE Wireless Communications, vol. 11, Issue 3, Jun. 2004, pp. 62-71.
(Continued)

*Primary Examiner* — Edan Orgad
*Assistant Examiner* — Sithu Ko

(57) ABSTRACT

Application data traffic transmitted and received by wireless devices in a network may be mapped to channels based on traffic type and channel metrics. The traffic type may be classified by modality such as by voice, video, application sharing, instant messaging, emergency call, or any other application modality. The channels may be associated with characteristics that include, for example, a frequency band or channel metrics. The traffic types may be prioritized relative to one another and each may be associated with a hierarchical frequency band prioritization or a channel prioritization based on other channel metrics. A list of traffic types or modalities may be mapped to a list of available channels in a network by mapping channel characteristics to modalities based on modality traffic type prioritization, frequency band prioritization or channel metric prioritization. The mapping may then be utilized to control channel assignment for devices operating in the network.

20 Claims, 5 Drawing Sheets

(56) References Cited

U.S. PATENT DOCUMENTS

| | | | |
|---|---|---|---|
| 9,332,547 B1* | 5/2016 | Ghavami | H04W 72/0453 |
| 2006/0160551 A1* | 7/2006 | Matoba | H04W 16/14 |
| | | | 455/509 |
| 2007/0008978 A1* | 1/2007 | Pirzada | H04L 45/306 |
| | | | 370/395.43 |
| 2007/0026868 A1 | 2/2007 | Schulz | |
| 2008/0192753 A1 | 8/2008 | Li | |
| 2008/0279140 A1* | 11/2008 | Gaur | H04W 72/02 |
| | | | 370/329 |
| 2012/0057536 A1* | 3/2012 | Verma | H04W 72/0453 |
| | | | 370/329 |
| 2013/0012180 A1 | 1/2013 | Backholm et al. | |
| 2014/0056154 A1* | 2/2014 | Agarwal | H04W 4/02 |
| | | | 370/252 |

OTHER PUBLICATIONS

Masonta, et al., "Standard Compliant Channel Selection Scheme for TV White Space Networks", In Proceedings of Southern Africa Telecommunication Networks and Applications Conference, Aug. 31, 2014, 6 pages.

Mustafa, et al., "Spectral Efficiency Improvements in HetNets by Exploiting Device-to-Device Communications", In Proceedings of Globecom Workshops, Dec. 8, 2014, 6 pages.

Lohmar, et al., "Delivering content with LTE Broadcast", In Journal of Ericsson Review, Feb. 11, 2013, pp. 1-8.

Gupta, et al., "Enhancing Wi-Fi with IEEE 802.11u for Mobile Data Offloading", In International Journal of Mobile Network Communications & Telematics, vol. 2, No. 4, Apr. 2012, pp. 19-29.

"Workshop on CellulAR Traffic Offloading to Opportunistic Networks", Retrieved on: May 21, 2015 Available at: http://conference.researchbib.com/?action=viewEventDetails&eventid=48157&uid=rb2089.

Jordan, et al., "Simulative Considerations for Future 4G Hierarchical Mobility Management in All-IP Networks", In Proceedings of Sixth International Conference on Networking, Apr. 22, 2007, 6 pages.

Tripathi, et al., "Mobility Management Issues in 3G & 4G Network", In Journal of Advanced Computing and Communication Technologies, vol. 2, Issue 4, Aug. 2014, pp. 17-19.

"Second Written Opinion Issued in PCT Application No. PCT/US2016/039528", dated Feb. 3, 2017, 7 Pages.

PCT search report in counterpart international application PCT/US2016/039528, dated Sep. 20, 2016.

"International Preliminary Report on Patentability Issued in PCT Application No. PCT/US2016/039528", dated Apr. 26, 2017, 8 Pages.

* cited by examiner

| Modalities | Frequency Band Prioritizations | |
|---|---|---|
| | 1st level | 2st level |
| Voice | 5 GHZ | 5 GHZ, TVWS, 2.4 GHZ, 300 MHZ |
| App sharing | 2.4 GHZ/5 GHZ | |
| Video | 5 GHZ (LB), 60 GHZ (if available) | 60 GHZ, 5 GHZ (LB), 5 GHZ (DFS) |
| IM | 2.4 GHZ | 2.4 GHZ, TVWS |
| Emergency Call | TVWS | TVWS, 5 GHZ, 2.4 GHZ, 300 MHZ |

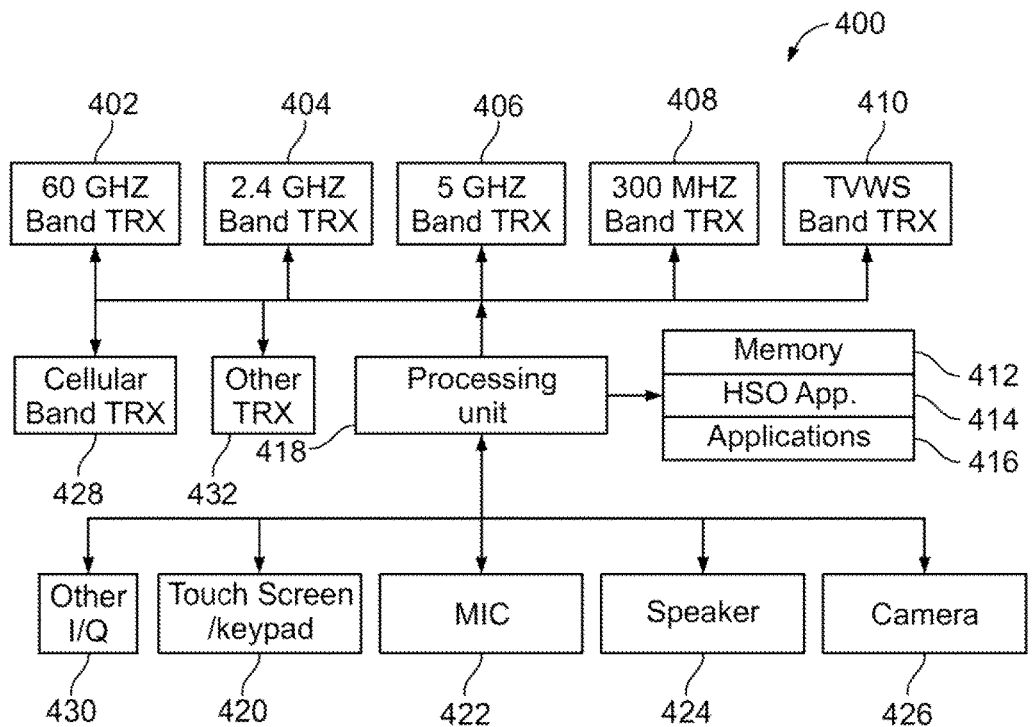
FIG. 4A
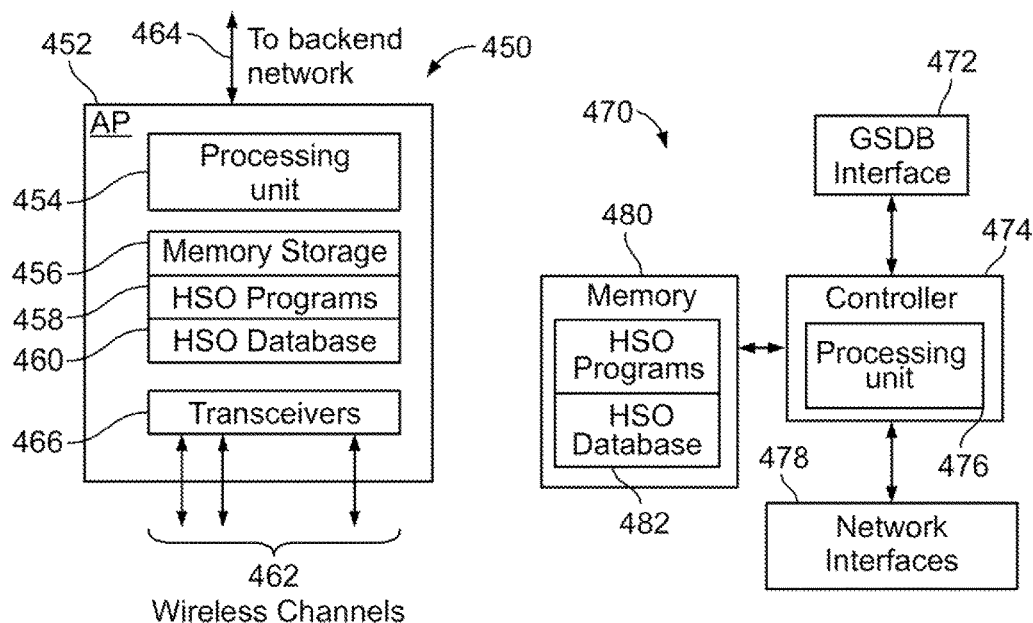
FIG. 4B
FIG. 4C

HIERARCHICAL SPECTRUM OFFLOAD

BACKGROUND

Wireless Local Area Networks (WLANs) that support multiple types of wireless devices, mobile or otherwise, have become ubiquitous in various types of environments. For example, WLANS are now commonly used with mobile devices of cellular systems to data traffic off load when a mobile device of a cellular subscriber is operating in the coverage area of an available WLAN. WLAN environments may include, for example, business environments in which a large number of employees using many different types of devices are supported, commercial establishments having Wi-Fi hotspots supporting customer devices, or home WLAN environments in which multiple computing devices, gaming devices, and smart televisions may be supported.

As wireless communications technology evolves, the need for these Wireless Local Area Networks (WLANs) to provide more sophisticated services and higher performance increases. A mobile device and access point may potentially be required to transmit and receive data traffic in a WLAN for a number of device applications that may be running concurrently on the mobile device. The numbers, and the types, of these mobile devices and the sophistication of the device applications are constantly increasing. This increase in the number and in the types of mobile devices that support increasingly sophisticated device applications requires that WLANs will need to support higher performance traffic, at higher traffic volumes, while providing a level of service that is satisfactory for all users on a network.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus that provide hierarchical spectrum offload in a wireless network are disclosed herein. In disclosed example embodiments, channels of a wireless network may be assigned for transmission of data traffic sent or received by applications on a mobile device based on the traffic type of the data traffic being sent or received by an application and on characteristics of the channels.

In example embodiments, applications operating on a mobile device may be associated with a traffic type of the application and the channels of a wireless local area network (WLAN) network may each be associated with one or more channel characteristics. An application may be assigned a channel for transmission of data based on the application's traffic type and characteristics of available channels. In an embodiment, the traffic types of an application may be defined based on a modality classification of the applications such as voice, video, instant messaging, emergency calling, application sharing, push notifications, etc. Each modality or application traffic type may be associated with one or more channel characteristics that may be mapped to the channel characteristics of the available channels. An application may be assigned traffic channels based on its modality. In one embodiment the channel characteristic may include a frequency band value, in other embodiments the characteristics may include channel metrics such as, for example, a reliability index or other metrics related to channel performance or quality of service (QoS).

In other example embodiments, the different possible traffic types or modalities of applications may each be associated with a hierarchical priority for available channels relative to one another. For example, voice traffic may be prioritized over data traffic such as instant messaging traffic for assignment of higher performance channels. Each traffic type or modality may also be associated with one or more prioritizations that indicate a prioritization of characteristics of channels for assignment to that traffic type. For example, the traffic type or modality of an application may have a frequency band prioritization hierarchy that indicates an order of preference for possible values of the frequency band of available channels that may be assigned to the application. Each traffic type or modality may also be associated with one or more prioritizations that indicate an order of preference for other channel characteristics such as, for example, a reliability index or other metrics related to channel performance or quality of service (QoS). A channel may be assigned to the application data traffic by utilizing the frequency band prioritization and metric hierarchies and a comparison of the frequency bands and metrics of available channels.

Example embodiments may be implemented within a network by creating and maintaining a database that includes a mapping of mobile device application traffic types or modalities to channels in the network based on the traffic type and channel characteristics. The database may be utilized, for example, by a mobile device for choosing channels when an application on the mobile device needs to transmit or receive data traffic in the network or upon offloading of data traffic of the mobile device from a cellular system to a WLAN network. The database mapping may be configured within the network infrastructure entities, for example, in an access node or at a server. The database may be accessed from the infrastructure as necessary by the mobile device, or retrieved and stored on the mobile device and accessed as necessary. Alternatively, the mobile device may configure the database or a combination of entities in the network may configure the database. Changing conditions in the network may be accounted for by updating the database as necessary.

BRIEF DESCRIPTION OF THE DRAWINGS

FIG. 4A is a simplified block diagram of an example mobile device which may be implemented in the system of FIG. 1;

FIG. 4B is a simplified block diagram of an example access point, which may be implemented according to FIGS. 3C and 3D; and, FIG. 4C is a simplified block diagram of an example network database server which may be implemented according to FIGS. 3C and 3D.

DETAILED DESCRIPTION

Figure 1:
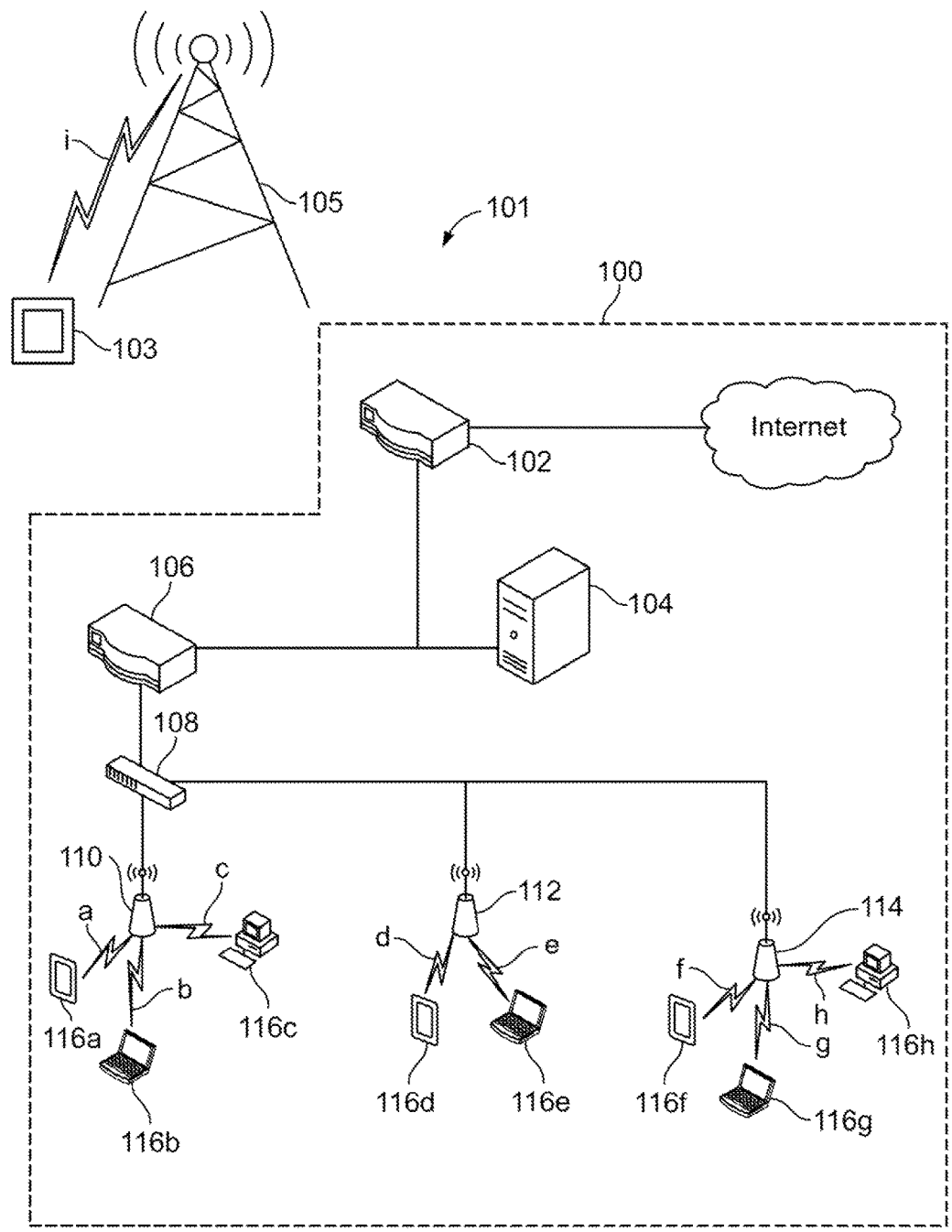
FIG. 1 is as simplified diagram of a system in which embodiments of hierarchical spectrum offloading are implemented.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus that provide hierarchical spectrum offload in a wireless network. The embodiments may be utilized, for example, when offloading mobile device data traffic from a cellular system to a wireless local area network (WLAN) when a mobile device has come into the coverage area of the WLAN. The embodiments may also be utilized for channel assignment in stand alone WLAN networks such as, for example, enterprise networks, or any other type of WLAN network.

Applications operating on mobile devices may be assigned to channels of network in as hierarchical manner that provides the best available, channels for a particular application by taking application traffic type into account in the context of other possible traffic types and based on network channel characteristics. Frequency bands and channels may be assigned so that application traffic having higher reliability or quality of service requirements is assigned to higher performance channels. Applications with traffic having lesser reliability or quality of service requirements may be assigned to lower performance channels keeping the higher performance channels free for other more demanding applications. An application having more than one traffic type may be assigned a separate channel for each traffic type based on different requirements of the traffic types. This provides an improvement over spectrum offloading that is done irrespective of the differences in the types of applications that are operating on a mobile device.

The embodiments allow a network to be configured to provide more efficient use of spectrum available for offloading by allowing the offloading of different types of data traffic in a hierarchical manner to preferred frequency bands for each type of data traffic, depending on application importance. The preferred frequency bands may be associated with a particular type of traffic based on application traffic requirements. Network considerations may also be taken into account when associating preferred frequency bands with traffic. For example, interference may be minimized for an application on a mobile device by assigning frequency bands or channels that exhibit less interference from neighboring networks or systems, depending on the application's requirements. Also, use of the embodiments allows more efficient determinations to be made when offload is available to a device having applications operating on a data channel of a cellular system. For example, embodiments may be used to determine that available channels of a WLAN cannot meet the channel requirements for data traffic of a particular application and the particular data traffic will not be offloaded.

In one embodiment, a database that includes information that maps application traffic types or modalities to channels in a network may be dynamically updated by using current system data on channel performance or availability. For example, the database may be dynamically updated by taking into account changing channel characteristics or the latest information on available channels such as, for example channels in the television white space spectrum (TVWS). This avoids problems that may be caused by assignment of channels that may have degraded and increases network efficiency by allowing all potentially available channels to be used in offloading.

Referring now to FIG. 1, therein is a simplified diagram of an example system in which embodiments of hierarchical spectrum offloading according to the disclosure may be implemented. System 101 includes wireless network 100, which may be, for example, a local area network (WLAN), and, a cellular system, represented by base station 105 and cellular mobile device 103. Network 100 includes router 102, access point/gateway 106, server 104 switch 108 and access points 110, 112, and 114. Router 102 access point/gateway 106, server 104, and switch 108 may be configured to provide traffic routing and switching functions for traffic to and from the access points 110, 112, and 114 over the infrastructure. Mobile devices 116a-116h are shown operating within the coverage area of network 100 and communicating with a nearby access point of access points 110, 112 or 114 over the communication links a-h. In the example implementation of FIG. 1, one or more of mobile devices 116a-116h may be dual mode and operable to communicate with both base station 105 and with network 100. In this case network 100 may be used for hierarchical spectrum offload for data traffic of the dual mode devices from the cellular system when the dual mode devices are operating within the coverage area of network 100. In alternative embodiments network 100 may also support devices of mobile devices 116a-116h that operate only in network 100 or network 100 may be a private business network, a commercial/retail establishment network, or any other type of wireless network.

Server 104 is illustrated as single server but may be representative of server functions or server systems provided by one or more servers or computing devices that may be co-located or geographically dispensed. Server 104 may also be located remotely from network 100. Also, while devices 116a-116h are each shown as implemented as one of an example smart phone, a tablet computer, a desktop computer, or laptop computer device, each of the example devices 116a-116h may be alternatively implemented as any other type of device, or number of devices, that may be configured with functionality supporting the embodiments disclosed herein. These other types of devices may include, for example, gaming, devices, media devices, smart televisions, home theater systems, smart automobile systems, smart house systems, multimedia cable/television boxes, smart phone accessory devices, tablet accessory devices, personal digital assistants (PDAs) portable media players, smart watches, or industrial control systems.

In an example implementation, network 100 may operate over a range of frequencies on communication links a-h according to IEEE 802.11 standards specifications. The frequency range may include frequency bands in the range of 300 MHz to 90 GHz, each according to the 802.11 specification for the particular frequency band. For example, network 100 may include access points 110-114 that each include transceivers operable according to one or more of the 802.11a (5 GHz), 802.11b (2.4 (Hz) 802.11g (2.4 GHz) 802.11n (2.4/5 GHz), 802.11ac (5 GHz), 802.11ad (60 GHz), or 802.11af (54-698 MHz (TVWS)) standards. The 802.11ac standard may include the capability to allocate designated dynamic frequency selection (DRS) channels in the 5 GHz band when DRS channels are available for use. The access points 110-114 may be capable of communicating on channels of various baud widths within the frequency ranges according to the standard being used for the communications. The access points 110-114 may also include transceivers operating in the 300 MHz range. In alternative example implementations, network 100 may also operate over any other electromagnetic frequencies, including optical wavelengths, or communication medium, and may include transceivers according to any other standards specifications, including any non-802.11 packet/framing protocols.

Wireless devices 116a-116h may each also be operable to communicate with the network access points 110-114 according to one or more of the IEEE 802.11 standards specifications on which the access point operates. Wireless devices 116a-116h may each include one or more applications that communicate data traffic with one of access points 110-114 when in the coverage area of network 100. These applications may include any type of application communicating over network 100, such as client applications communicating with a client application on another device in network 100, or in another network, applications included in the device operating system, applications installed or downloaded to the wireless device 116 by a user, or any other type of function that communicates through network 100. Wireless devices 116a-116h may also include devices communicating directly over a wireless interface with one or more other devices without using access points 110-114. These devices may include one or more applications communicating over a wireless interface directly with applications in other devices such as for example, peer to peer or device to device applications. These applications communicating directly with other devices could include, for example, devices using the 802.11 2.4 GHz Wi-Fi direct standard for a direct device to device connection.

The applications on wireless devices 116a-116h may be classified into modalities depending on the data traffic transmitted and received by the application. As used in this disclosure modality means, generally, a data traffic type. Modality may be used to mean the data traffic type of as data stream from an application that has specific criteria associated with that data traffic. Modality may also be used to mean a classification of data traffic from a plurality of applications such as, for example, voice, app sharing, video, instant messaging (IM), emergency call, push notification, or other types. Generally, modality may be used to mean or define a single traffic stream from an application, a single traffic type, or a group of traffic types, for classification of data traffic from applications for use in hierarchical spectrum offload. Depending on system configuration, there may be more than one modality class created for certain general categories of applications. For example, traffic from voice applications may be classified into a number of separate voice modalities, voice 1, voice 2 . . . voice n, depending on the requirements of each application. As another example, general categories of traffic may be combined into a single modality, for example, application sharing and instant messaging (IM) may be combined.

Figures 2A, 2B:
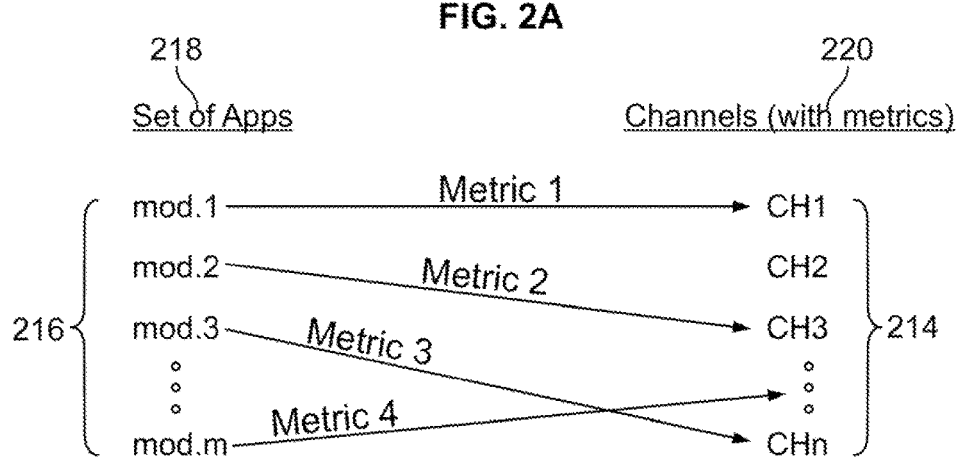
FIG. 2A is a diagram of example modality prioritizations and example frequency band prioritizations associated with each application modality.
FIG. 2B is a diagram of example mappings of modalities to wireless network channels based on metrics.

Referring now to FIG. 2A, therein is a diagram of example frequency band prioritizations that may be associated with application modalities. The information included in FIG. 2A may be stored in an appropriate database for access and used in network 100 when channels are to be assigned to application data traffic. FIG. 2 includes modality column 201 that includes a list of modalities 202 for voice 204. App sharing 206, Video 208, IM 210, and Emergency Call 212. Each modality of FIG. 2A is associated with a row of Frequency Band Prioritizations in column 203. Each modality may also be associated with a priority for frequency band allocation relative to each of the other modalities. In FIG. 2A, for example the priority of each modality may be indicated by its relative position from top to bottom in column 201 as compared to the other modalities. For example, Voice modality 204 may have a higher priority for frequency assignment of its first level priority frequency of 5 GHz than the other modalities. The Frequency Band Prioritization for each modality may include a first level and second level frequency prioritization. In the example of FIG. 2A, Voice modality 204 is associated with a first level choice of the 5 GHz band. The second level choices of frequency bands for Voice modality 204 are TVWS, 2.4 GHz and 300 MHz in order of priority. The Video modality 208 has a first level prioritization of 60 GHz (if available) or 5 GHz (LB) tin the lower 5 GHz band) if 60 GHz is not available. The second level choices of frequency bands for Video modality 208 are 5 GHz (LB), and 5 GHz (DFS). Emergency (all modality 212 is associated with a first level choice of the TVWS band. The second level choices of frequency bands for Emergency Call modality 212 are 5 GHz, 2.4 GHz and 300 MHz in order of priority. App Sharing modality 206 has a frequency prioritization set for either 2.4 GHz or 5 GHz.

In example implementations for determining frequency band prioritizations, an authorization element associated with one or more of the modalities may be considered. For example, a modality of an emergency services first provider's functions or applications may be assigned authorization for a restricted frequency band (such as 4.9 GHz), as well as other available frequency bands in a prioritization. The authorization may be based on the criticality of the function or application, or on governmental regulation, and other applications would not be authorized to use the restricted frequency bands. For each of the modalities, with the proper authorization, a user may be assigned an otherwise restricted frequency. In addition, an authorization element may be implemented to indicate a priority to limit access to a frequency. For example, a priority to limit access to a restricted frequency band may be assigned to one or more modalities and cause the restricted frequency band to be placed at a low level priority for those modalities. This may be used to limit overall use of the restricted frequency band for those modalities to only when other frequencies are not available. In one implementation, for example, the network may limit access or minimize access to the TVWS and DFS frequency bands to certain modalities using authorization elements.

In one example embodiment, the information in FIG. 2A may be used to assign channels for data traffic of applications on any of devices 116a-116h operating within network 100. In this embodiment each channel of the network 100 may be associated with a characteristic that indicates the frequency band of the channel. The data traffic of an application on a device 116 may be assigned to a channel by mapping an available channel having the appropriate frequency band indication characteristic according to the frequency priorities of the modality, or modalities, of the application that is transmitting the data traffic. In an alternative embodiment, frequency band prioritization information, such as that shown in FIG. 2A, may be considered and weighted along with other application preferences for other channel characteristics, such as band width, delay, jitter, reliability, etc., when mapping a channel to data traffic of a modality. In one example implementation, each of the modalities may also be associated with a metric that includes an acceptable range for one or more channel characteristics for the modality. The modalities may be assigned to a channel by mapping a channel having a frequency that is the highest priority preferred frequency for each modality that also meets the acceptable metrics for the modality.

Channel characteristic or characteristic as used in this disclosure means any characteristic or property of a wireless channel and may include frequency band, band width, reliability metrics. QoS metrics, a received signal strength indicator (RSSI), a packet error rate (PER), performance metrics, or any other characteristic that may define or describe the channel relative to another channel.

The information included in FIG. 2A may be stored in an appropriate database for access and used in network 100 when channels are to be assigned or mapped to application data traffic. The assignment or mapping of modalities to frequency channels may be done when a channel is needed or done at predetermined times to provide available channels at the time of the mapping and account for changes to the network wireless environment. For example, a mapping may be pet tot each time the available channels in the network change, such as when the TVWS channel allocation for the geographic region in which network 100 operates has been updated.

Referring now to FIG. 2B, therein is a diagram of example mappings of modalities to wireless network channels based on channel characteristics according to another embodiment. FIG. 2B shows column 218, that includes a set of applications 216 listed by modality types (mod.1-mod. m) and column 220, that includes channels 214 listed by network channel number (CH1-CHn). In FIG. 2B each modality mod.1-mod. M, respectively, may be associated with a metric of metric 1—metric m. Also, each Channel of CH1-CHn may be associated, with at least one characteristic that includes as metric or set of metrics. The information included in FIG. 2B may be stored in an appropriate database for access and used in network 100 when channels are to be assigned or mapped to application data traffic. The assignment or mapping of modalities to channels may be done when a channel is needed or done at predetermined times to provide a listing of channels available at the time of the mapping and account for changes to the network wireless environment. The information on the assignment or mapping may be updated each time the available channels in the network change, for example, when the TVWS channel allocation has been updated. Also, the information on assignment or mapping in FIG. 2B may be updated dynamically using updated channel metrics to account for changes in the network 100, or changes in the wireless environment of network 100.

In one example implementation of FIG. 2B, each channel may be associated with a characteristic that includes a set of metrics, such as a delay, a bandwidth metric indicating delay and bandwidth of the channel, a RSSI of the interference environment of the channel or a PER. A channel metric may also include a metric associated with the channel that can be used as part of a channel assignment to a particular modality. For example, a channel metric may include an RSSI computed and stored for a modality based on prior use of the channel for that, modality. The metric may be computed, for example, by a device that was operating within a predetermined distance, or in a similar area, of a device that is currently being assigned channels for that modality. In alternative implementation the metrics may be defined in any way that allows comparison of the channel metrics with modality requirements for mapping the channel assignments. Each modality may also be associated with a modality metric or modality requirement that is in a form that allows comparison with the channel metrics to determine, which channels may be mapped to the modality. For example, each modality may be associated with a metric that includes delay requirements and bandwidth requirements for the modality. The channel metric for delay may be given, for example, as an average value, or, as values including upper and lower bounds. If the channel metric for delay is given as an average, value, the modality metric may include an indication of a range of acceptable average delays and a channel may be acceptable if the average delay is in that range for the modality. If the channel metric, for delay is given as upper and lower bounds, the modality metric may include a desired delay and a channel may be acceptable for the modality if the desired delay falls within the upper and lower bounds.

In the example where the metrics include delay and bandwidth requirements, a channel that meets the bandwidth requirements and the delay requirements of a modality may be mapped to the modality. The metrics that are compared to match a channel with a modality may include any appropriate metric or parameter and may be defined and compared in any appropriate way. This may include prioritizing one metric over another when only one metric of a set can be satisfied, or using metrics of a second priority when a first metric that cannot be satisfied. In one embodiment of FIG. 2B, the mapping of modalities to channels may be done based only on the quality metrics without considering frequency band, or frequency band priorities or information such as that shown in FIG. 2A. In this implementation, the channels may fall within any frequency band and mapping would be based on the channel quality metrics.

In an alternative embodiment of FIG. 2B, frequency band prioritization information, such as that shown in FIG. 2A, may be considered and weighted along with other application preferences for channel quality characteristics, such as bandwidth, delay, jitter, reliability, etc., when mapping, a channel to a modality. This may include, for example, attempting to find a channel for a modality in a preferred frequency hand having acceptable metrics, and then attempting the find a channel in a next preferred frequency band for the modality if a channel with acceptable metrics was not found in the preferred frequency band. Implementations may include using the aspects of FIGS. 2A and 2B in various combinations.

Figure 3A:
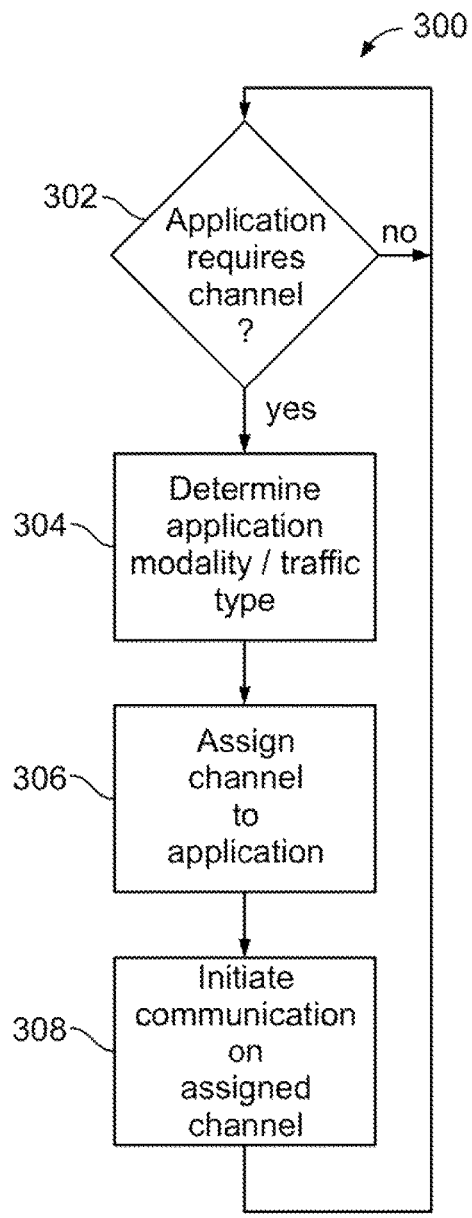
FIG. 3A is a flow diagram illustrating operations in a device in which an example embodiment of the disclosure is implemented.

Referring now to FIG. 3A, therein is a flow diagram illustrating, operations performed in a device in which an example embodiment of the disclosure is implemented. The process of FIG. 3A may be performed, for example, on any one of mobile devices 116a-116h in network 100. The process begins at 302, where it is determined if a device application requires a channel for data traffic. If no channel is required the process loops back to 302 and continues monitoring to determine if a channel is required. When it is determined at 302 that a device application requires a channel, the process moves to 304. At 304 the modality of the application is determined. Determining modality may include determining or defining the type of traffic stream required for the application (such as a single traffic type or a group of traffic types). The determination at 104 may be based on information stored in the device that is associated with the particular application or provided by the application. In one embodiment the determination may provide a modality category such as one or more of the modalities shown in column 201 of FIG. 2A for the data traffic of the application that requires a channel. Depending on the application, more than one modality may be determined at 304. For example, if the application uses both voice and video traffic, a voice and a video modality may be determined.

At 306, as channel or channels are assigned to the application based on the determination of modality. This may be done by assigning a data traffic stream (or each data traffic stream if more than one) of the application to a channel or channels based on the determined modality or modalities of the application. In the embodiment of FIG. 3A, the channel assignment may be performed by accessing a database that includes information mapping application modality types to channels and assigning channels according to the mapping. Assigning a channel during operation 306 is discussed in further detail below in relation to FIG. 3B.

At 308 the process initiates communications for the application on each of the assigned channels. This may be done by generating information that is used in the device 116 to control an appropriate transceiver of the device 116 to transmit on the assigned channel or channels.

Figure 3B:
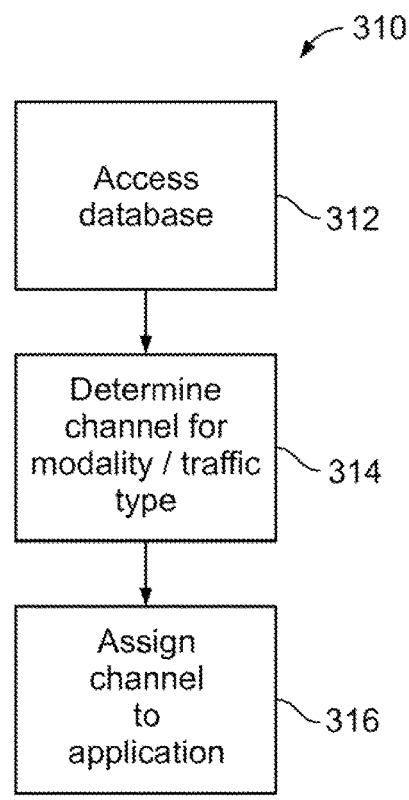
FIG. 3B is a flow diagram illustrating operations in a device when assigning a channel in the flow diagram of FIG. 3A.

Referring to FIG. 3B, therein are shown operations used to assign a channel during operation 306 of FIG. 3A. At 312 a database is accessed. The database may be based, for example, on channel mappings configured as shown in and described in relation to FIG. 2A or FIG. 2B. The database may be stored on the device implementing the process of FIG. 3A, for example, one of devices 116a-116h. Alternately, the database may be stored on another device or entity in the network such as, for example, on an access point of access points 110-114, or on a remote device, for example, server 104. Also, the database may be created on one or more of the other devices or entities in the network or on a remote device, and sent to a device 116 for storage and case in implementing the process of FIG. 3A. Referring again to FIG. 3B, at 314 the database is used to determine a channel and, at 316, assign as data traffic stream (or each data traffic stream, if more than one) of the application to a channel or channels based on the determined modality or modalities of the application to complete the operation of 306 of FIG. 3A.

Figure 3C:
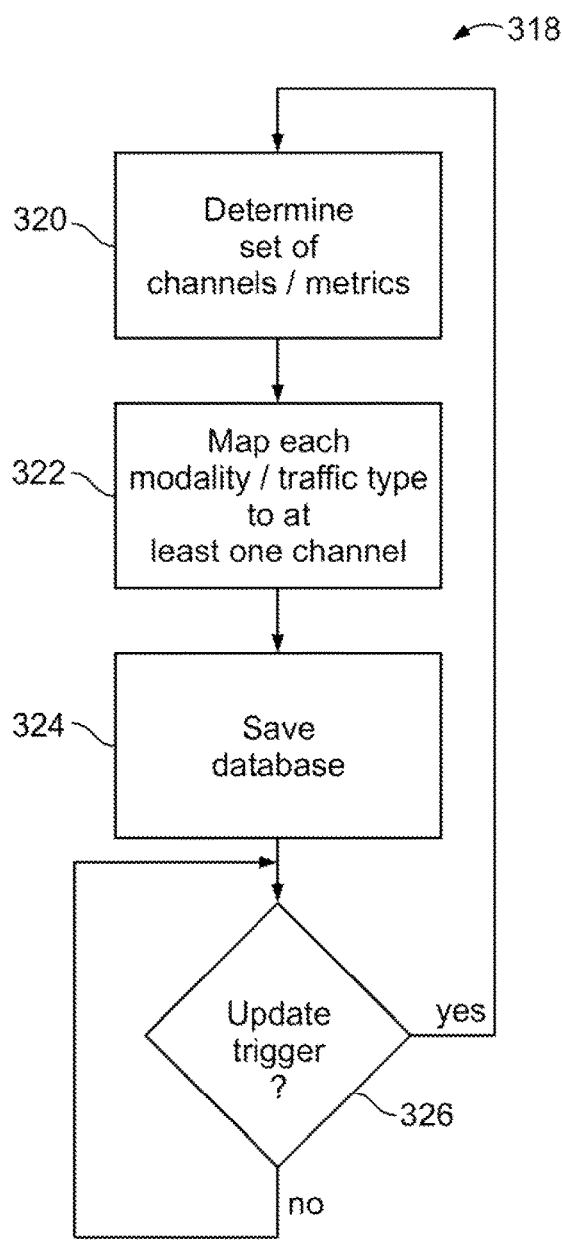
FIG. 3C is a flow diagram illustrating operations for configuring a database of modalities mapped to channels in a network according to an example embodiment of the disclosure.

Referring now to FIG. 3C, therein is a flow diagram that illustrates operations for configuring a database of application modalities mapped to channels of a network according to an example embodiment. The process of FIG. 3C may be performed on different system or network entities, for example, on server 104 of FIG. 1, or in any one of access points 110-114 in network 100 of FIG. 2, or at one of the mobile devices 116a-116h. In alternative implementations, the operations of FIG. 3C may be performed by a combination of those entities.

The process of FIG. 3C begins at 320 where a set of channels and channel characteristics are determined. The channels may be determined by generating a list of channels currently allowed for use by network 100 and for which access points 110-114 are operable to communicate on. The list of channels may include channels allocated for the frequency bands and 802.11 standards according to which network 100 may operate and/or channels that are allocated on a changing basis. For example, the geo-location spectrum database (GSDB) for the geographical region in which network 100 is located may be queried for current information to determine channels in the TVWS band that are allowed to be used and which may be put on the list. Each channel on the list may then be associated with one or more channel characteristics. At 322 a list of application modalities may then be mapped to one or more of the channel on the channel list based on the channel characteristics and requirements of each modality. The mapping may be performed according to the mappings shown in and described in relation to FIGS. 2A and 2B.

Figure 3D:
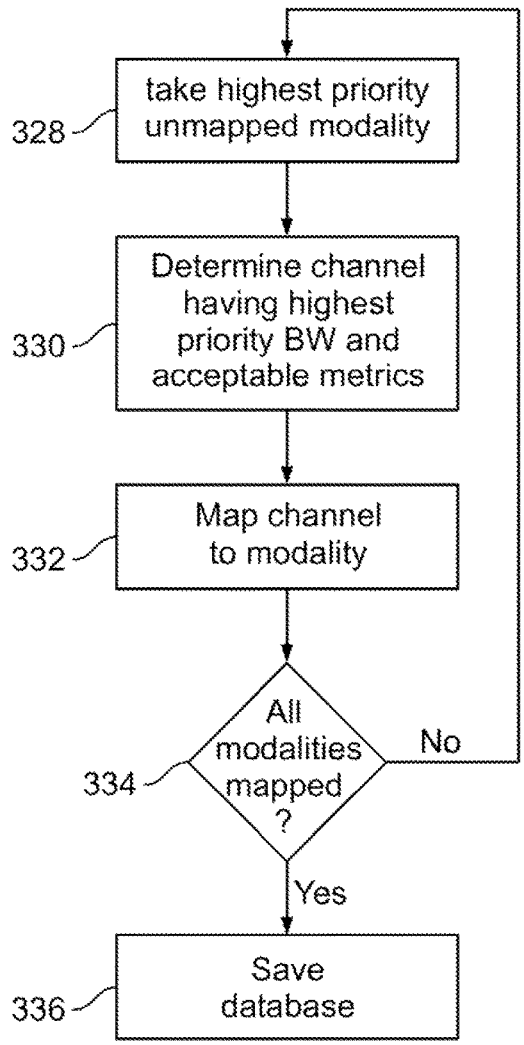
FIG. 3D is a flow diagram illustrating operations mapping modality traffic types to channels in a network according to an example embodiment of the disclosure.

Referring now to FIG. 3D, therein is as flow diagram that illustrates an example of a mapping of modality traffic types to channels that may be performed as operation 322 of FIG. 3C. At 328 an unmapped modality having the highest priority for channels relative to the other unmapped modalities is selected for mapping. At 330 as channel in the frequency hand that is the highest available frequency band in the frequency hand prioritization hierarchy of the selected modality is selected. In one implementation of FIG. 3D, metrics associated with the selected channel are also checked to determine if they satisfy requirements of the selected modality for channel metrics. If channel metrics are not satisfied the process will begin again at 328 by selecting a different channel. In other implementations of FIG. 3D, the determination at 330 may be performed by only considering the frequency band of the channel and the modality's frequency band prioritization or, by only considering channel metrics and requirements of a modality on channel metrics when determining a channel for mapping to a modality. At 332 each channel determined in 330 is mapped to the selected modality. The process continues until it is determined at 334 that all modalities have been mapped to one or more channels. At 336 the process returns to 324 of FIG. 3C and the database of modalities mapped to channels is saved. The channels used in the mapping in the database may be determined based on information on the transceiver capabilities of the mobile devices for which the database is being prepared. For example, at 320 of FIG. 3C, transceiver capability information on a group of one or more mobiles may be used to determine a set of channels that match the device transceiver capabilities of that group to create the database for that group.

The database may be saved on the network entity that created the database for use at that network entity, or sent to another entity for use. For example, if the database is created on server 104 or at one of the access points, the saved database may be sent to one or more of mobile devices 166a-116h and stored in the device for use by the device in assigning channels to its applications. In another implementation, for example, the database maybe stored on a network entity and queried by the mobile device when a device application requires a channel. In other example alternatives the database may be stored in the cloud, for example, on a database accessible on the internet, or on the premises of a corporate network.

When the database has been created it may be updated as necessary to ensure that the information on the channels that are mapped in the database is current. For example appropriate timers may be set or other criteria may be used to trigger an update at 326 to cause the set of channels and channel characteristics to be re-determined. This may be done to account for changing conditions in the wireless environment of network 100 such as, for example, interference from neighboring wireless networks, and the effects those changing conditions may have on channel characteristics. The update may also use information to account for changing channel availability of channels for network 100, for example, the changing of channels permitted for use by regulatory authorities in the TVWS band. When an update is triggered at 326 of FIG. 3C the database will be remapped and saved again as previously described for FIG. 3D. In another example implementation, the database may be updated each time a new mobile device enters the coverage area of network 100 and requires a channel for offloading.

Referring now to FIG. 4A, therein is a simplified block diagram of an example mobile device which may be implemented in network 100 to perform the operations shown in FIGS. 3A and 3B. Device 400 represents a possible implementation any of devices 116a-116h or any other device that may operate in network 100, according to the embodiments of the disclosure. Device 400 may include a touch screen/keypad 420, microphone 422 speaker 424 and camera 426 which receive inputs and provide outputs to and from device 400. Device 400 may also include "Other" input/outputs (I/O) 430 for any other type of I/O device. Other I/O 430 may include, for example, health monitor devices, weather monitors industrial supervisory control and data acquisition (SCADA) equipment, or, generally, any function that may transmit and receive data in network 100. These inputs and outputs may be used to generate and receive data traffic over traffic channels in network 100 that are assigned to applications according to the disclosed embodiments. Device 400 includes processing unit 418 and memory 412 which is shown as including program code or instructions for hierarchical spectrum offload (HSO) applications 414 that perform functions according to the embodiments. Memory 412 may also include other device applications 416. Memory 412 may be implemented as any type of computer readable storage media in device 400, including non-volatile and volatile memory. Memory 412 also includes instructions in the form of code for running the operating system to control the operations of device 400. Memory 412 also may include data such as media data, camera photos and videos, contact data, calendar data and other files used in the operation of applications on device 400 that may utilize data channels assigned according to the disclosed embodiments. Processing unit 418 may comprise one or more processors, or other control circuitry or any combination of processors and control circuitry. Processing unit 418 provides overall control of device 400 and the other functional blocks shown in FIG. 4A by implementing instructions and code in memory 412 to provide functions for operation in network 100.

Device 400 includes transceivers (TRXs) operating in different frequency bands as shown by 60 GHz Band TRX 402, 2.4 GHz TRX 404, 5 GHx Band TRX 406, 300 MHz Band TRX 408, TV WS Band TRX 410, and cellular band TRX 428. Device 400 may also include other TRX 432. Other TRX may include, for example, public safety (4.9 GHz) TRX, LIAS TRX, or any other TRX in any band having appropriate data type and authorization. In the embodiments device 400 and its transceivers may be operable to use one or more spectrum allocations that are allowed in each of the designated frequency bands according to the relevant IEEE 802.11 or any other standard specifications supported by network 100. For example, TRX 406 may be operable on dynamic frequency switching (DFS) channels as well as on the non-DFS channels within the 802.11ac 5 MHz spectrum. Also, TRX 410 may use currently available TVWS channels according to requirements and regulations of the geographic area in which network 100 operates. Cellular band TRX 428 may allow device 400 to operate in a cellular system such as that represented by base station 105 of FIG. 1. In embodiments data traffic maybe offloaded from cellular band TRX 428 to one or more of the other transceivers when device 400 is within the coverage area of network 100.

In an implementation of device 400, HSO application 414 causes processing unit 418 to control device 400 device to perform operations as shown in FIGS. 3A and 3B to assign channels to transceivers 402-410 and transceiver 432 for applications operating on device 400. In alternative implementations, the HSO application 414 may also cause processing, unit to perform other operations such as, for example, operations related to creating and updating the database in FIGS. 3C and 3D.

Referring now to FIG. 4B, therein is a simplified block diagram of an example access point which may be implemented in the network 100 to perform the operations of FIGS. 3C and 3D. One or more of access points 110-114 of network 100 may be implemented according to FIG. 4B. Access point 450 includes processing unit 454, transceivers 466, and memory/storage 456 that includes code and instructions for hierarchical spectrum (HSO) offload programs 458. Memory 46 may be implemented as any type of as any type of computer readable storage media, including non-volatile and volatile memory. Memory/storage 456 may also include 1150 database 460. Access point 450 connects to a backend network over interface 464. Processing unit 454 may comprise one or more processors, or other control circuitry or any combination of processors and control circuitry that provide overall control of the access point according to the disclosed embodiments. Transceivers 464 provide the capability for network 100 to communicate with devices, such as devices 116a-116b, over channels that may be assigned to device applications.

In an implementation of access point 450, HSO program 414, when executed, causes processing unit 454 to control access point 450 to perform operations as shown in FIGS. 3C and 3D for creating and updating a database that includes a mapping of application modalities to channels of network 100. The database may be saved in memory storage 456 and utilized according to the embodiments of the disclosure.

Referring now to FIG. 4C, therein is a simplified block diagram of an example network database server of an alternative embodiment for performing the operations of FIGS. 3C and 3D. Server 104 of FIG. 1 may be implemented according to database server 450 of FIG. 4C. Database server 470 includes controller 474 having processing unit 476, memory 480, network interfaces 478, and geo-location spectrum database (GSDB) interface 472. Memory 480 may be implemented as any type of computer readable storage media, including non-volatile and volatile memory. Memory 480 is shown as including HSO programs and HSO database 482. Controller 74 and processing unit 476 may comprise one or more processors, or other control circuitry, or any combination of processors and control circuitry that provide overall control of database server 470 according to the disclosed embodiments In an implementation of database server 470, HSO programs 482, when executed, causes processing unit 476 to control database server 470 to perform operations as shown in FIGS. 3C and 3D for creating and updating a database that includes a mapping of application modalities to channels of network 100. The data base may be saved in memory/storage 480 and utilized according to the embodiments of the disclosure. GSDB interface 472 may be controlled by processing unit 476 to access the appropriate GSDB database for the geographical location of network 100 for information used to update the channels in the HSO database 482

Server 104 is illustrated as a single server but may be representative of server functions or server systems provided by one or more servers or computing devices that may be co-located or geographically dispersed. The term server as used in this disclosure is used generally to include any computing devices or communications equipment that maybe implemented to perform the HSO functions and processes.

The example embodiments disclosed herein may be described in the general context of processor-executable code or instructions stored on memory that may comprise one or more computer readable storage media (e.g., tangible non-transitory computer-readable storage media such as memory 412, 456 or 480). As should be readily understood, the terms "computer-readable storage media" or "non-transitory computer-readable media" include the media for storing of data, code and program instructions, such as memory 412, 456 or 480, and do not include portions of the media for storing transitory propagated or modulated data communication signals The embodiments of the disclosure include a device comprising a transceiver portion operable to communicate on a plurality of channels over a plurality of frequency bands, each frequency band including at least one channel. The device further comprises at least one processor and memory, including code, the code executable to cause the at least one processor to assign a data traffic stream generated from an application having a modality to a selected channel of the plurality of channels by associating the modality of the application with the selected channel. The processor further controls the transceiver portion to transmit the at least one data traffic stream on its assigned selected channel. The selected channel may be associated with a characteristic that comprises a frequency band and the processor may assign the data traffic stream by associating the modality of the application to the frequency band associated with the selected channel. The modality may be associated with a prioritization of a plurality of frequency bands indicating relative preference for use of each of the frequency bands and the processor may assign the data traffic stream by associating the modality of the application to the frequency band of the selected channel based on the prioritization.

Embodiments of the device further include embodiments in which the modality of the application has a priority relative to other modalities for channel assignments and the at least one processor associates the modality of the application with a characteristic of the selected channel by taking into account the priority of the modality, and embodiments in which the selected channel is associated with a characteristic that comprises a metric and the processor assigns the data traffic stream by associating the modality of the application to the frequency band associated with the selected channel. The at least one channel metric of the selected channel may include a quality of service value, and, the at least one processor may assign the data traffic stream to a selected channel by processing information from a database that includes a list of application modalities mapped to the plurality of channels based on characteristics of each of the plurality of channels. The at least one channel metric may include a received signal strength indicator of the interference environment of the selected channel, a packet error rate, or the at least one channel metric may include a received signal strength indicator for the modality of the application computed and stored by an prior user of another device operating within a predetermined distance of the location of the device. The modality may be a classifier for a data traffic type generated by the application Further embodiments include the device where the application has a plurality of modalities, and wherein the at least one processor further divides the data traffic generated at the application into a plurality of traffic streams, each classified in one of the plurality of modalities, assigns each of the plurality of data traffic streams from the application to a channel of the plurality of channels by associating each of the plurality of the modalities with a separate channel of the plurality of channels, and controls the transceiver to transmit each of the plurality of traffic streams generated at the application on its associated separate channel. The application having a plurality of modalities may comprise a first application that communicates with a second application on another device, wherein the selected channel comprises a transmission channel, and wherein the at least one processor further controls the transceiver portion to receive each of a plurality of traffic streams generated at the second application on an associated reception channel and combine the received data traffic streams data generated at the second application into data traffic for processing by the first application.

Other embodiments of the disclosure include an apparatus in a wireless network, the apparatus comprising at least one processing unit and memory, including code, the code executable to cause the at least one processing unit to determine a set of channels, each channel of the set of channels having a characteristic, map each of a plurality of application modality types to at least one channel of the set of channels based at least in part on modality type and the characteristic of each channel, and configure a database for channel assignment in the wireless network. The memory may further include code that is further executable to cause the at least one processing unit to communicate information in the database to a processor controlling at least one transceiver in the network, wherein the processor utilizes the information in assigning channels to the at least one transceiver for data traffic. Also the at least one processing unit may determine updated data including a plurality of updated channel characteristic associated with the set of wireless channels and map at least one channel of the set of wireless channels at least one of a plurality of modality types based on each modality type and the plurality of updated channel characteristic to update the database. The characteristic of each channel may include a frequency hand, each modality type may have a preferred frequency band, and the apparatus may map each of the plurality of modality types by mapping each modality type to at least one channel having its preferred frequency band. The database may be stored on the cloud, stored on the premises of a corporate network, or stored in a device operable in the wireless network. Further embodiments include an apparatus in a wifeless network, the apparatus comprising at least one processor and memory including code, the code executable to cause the at least one processor to control the apparatus to assign a channel of a plurality of channels to application data traffic of an application operable in the wireless network based on a traffic type of the application and a characteristic of the channel, and generate control data to configure communication of the application data traffic on the assigned channel in the wireless network. The characteristic of each of the plurality of wireless channels may comprise a reliability index, the traffic type of the application may be associated with a reliability index prioritization and, the apparatus may assign the channel based on the reliability index prioritization and a reliability index of the assigned channel. The characteristic of each of the plurality of wireless channels may also comprises a frequency band, the traffic type of the application may be associated with a frequency band prioritization and, the apparatus may assign the channel based on the frequency band prioritization and a frequency band of the assigned channel. The apparatus may further comprise a controller implemented in infrastructure of a system including the wireless network, and the apparatus may communicate the generated control data to a mobile device on which the application is implemented. Alternatively, the apparatus may be implemented on a mobile device on which the application is implemented and the apparatus may communicate the generated control data to at least one transceiver of the mobile device. The apparatus may further assign a channel of the plurality of channels to the application data channel by accessing a database that includes a list of traffic types mapped to channels having frequency bands best suited for each listed traffic type.

While embodiments have been disclosed as having functions implemented on access points, servers and/or devices operating in a network, one or more of the functions may be implemented on different types of equipment. For example, one or more of the functions in the system shown as implemented on a server located in network infrastructure may be implemented on a device, such as mobile device, laptop computer or any other suitable device operating in a network.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may or combined with or be replaced by, any suitable devices, components architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device for communicating with a base station of a network on a plurality on channels, the device comprising:
   a transceiver portion operable to communicate on the plurality of channels with the base station over a plurality of frequency bands, each frequency band including at least one channel of the plurality of channels; and,
   at least one processor and memory, including code, the code executable to cause the at least one processor to:
   assign a data traffic stream generated from selected application having a modality to a selected frequency band of the plurality of frequency bands by associating the modality of the selected application to the selected frequency band based on a first prioritization, wherein the first prioritization indicates a relative preference for use of each of the plurality of frequency bands based on the modality of the selected application;
   assign the data traffic stream to a selected channel of the plurality of channels in the selected frequency band based on a second prioritization and at least one metric of the selected channel, wherein the second prioritization indicates a relative preference of each of a plurality of metric requirements being met for the modality of the selected application; and,
   control the transceiver portion to transmit the data traffic stream on the selected channel to the base station.

2. The device of claim 1, wherein the modality of the application has a priority relative to other modalities for channel assignments and the at least one processor associates the modality of the application to the frequency band based at least on the first prioritization by taking into account the priority of the modality.

3. The device of claim 1, wherein the plurality of metric requirements comprises a plurality of requirements for different types of channel metrics.

4. The device of claim 3, wherein the plurality of metric requirements the include a quality of service requirement.

5. The device of claim 3, wherein the plurality of metric requirements includes a received signal strength indicator requirement.

6. The device of claim 3, wherein the plurality of metric requirements includes a packet error rate requirement.

7. The device of claim 3, wherein the device is operating at a location, and the at least one metric of the selected channel includes a received signal strength indicator for the modality of the application computed and stored by a prior user of another device operating within a predetermined distance of the location of the device.

8. The device of claim 1, wherein the modality is a classifier for a data traffic type generated by the application.

9. The device of claim 1, wherein the selected application has a plurality of modalities each associated with one of a plurality of data traffic streams, and wherein the at least one processor further:
   assigns each of the plurality of data traffic streams from the selected application to a separate channel of the plurality of channels based on the first and second prioritizations; and,
   controls the transceiver to transmit each of the plurality of traffic streams generated at the application on its associated separate channel.

10. The device of claim 9, whereon the application comprises a first application that communicates with a second application on another device, wherein the selected channel comprises a transmission channel, and wherein the at least one processor further:
   controls the transceiver portion to receive each of a plurality of traffic streams generated at the second application on an associated reception channel; and, combines the received data traffic streams data generated at the second application into data traffic for processing by the first application.

11. An apparatus in a wireless network, the apparatus comprising:

at least one processing unit and memory, including code, the code executable to cause the at least one processing unit to:

determine a plurality of channels for use by a plurality of application modality types configured on at least one mobile device in the wireless network, each channel of the plurality of channels having a at least one metric and within one of a plurality of frequency bands;

map each of a plurality of application modality types to a corresponding frequency band of the plurality of frequency bands based on a first prioritization, wherein the first prioritization indicates a relative preference for use of each of the plurality of frequency bands by each of the plurality of application modality types;

map a selected one of the plurality of application modality types to at least one channel of the plurality of channels in its corresponding frequency band based on a second prioritization and the at least one metric of each of the plurality of channels, wherein the second prioritization indicates a relative preference for a plurality of metric requirements being met for the selected one of the plurality of application modality types;

configure a database for channel assignment in the wireless network based on the mapping of each of the plurality of application modality types to its corresponding frequency band and the mapping of the selected one of the plurality of application modality types to the at least one channel; and, provide information associated with the database for use by the at least one mobile device.

12. The apparatus of claim 11, wherein the code is further executable to cause the at least one processing unit to communicate information in the database to a processor controlling at least one transceiver in the network, wherein the processor utilizes the information in assigning channels to the at least one transceiver for data traffic.

13. The apparatus of claim 11, wherein the at least one processing unit further determines updated data including a plurality of updated channel metrics associated with the plurality of channels and further maps each of the plurality of application modality types to its corresponding frequency band and maps the selected one of the plurality of application modality types to the at least one channel based on each modality type, the plurality of updated channel metrics, the first prioritization, and the second prioritization.

14. The apparatus of claim 11, wherein the database is stored on the cloud.

15. The apparatus of claim 11, wherein the database is stored on the premises of a corporate network.

16. The apparatus of claim 11, wherein the database is stored in a device operable in the wireless network.

17. An apparatus in a wireless network including a mobile device and a base station configured to communicate on a plurality of channels, the apparatus comprising:

at least one processor and memory including code, the code executable to cause the at least one processor to control the apparatus to:

assign a channel of the plurality of channels to application data traffic of selected application on the mobile device having a modality to a selected frequency band of the plurality of frequency bands by associating the modality of the selected application to the selected frequency band based on a first prioritization, wherein the first prioritization indicates a relative preference for use of each of the plurality of frequency bands based on the modality of the selected application;

assign the application data traffic to a selected channel of the plurality of channels in the selected frequency band based on a second prioritization and metrics of the plurality of channels, wherein the second prioritization indicates a relative preference of each of a plurality of metric requirements being met for the modality of the selected application;

generate control data to configure communication of the application data traffic on the selected channel between the mobile device and the base station in the wireless network; and, provide the control data to the mobile device.

18. The apparatus of claim 17, wherein the apparatus comprises a controller implemented in infrastructure of a system including the wireless network, and the apparatus communicates the generated control data to a mobile device on which the application is implemented.

19. The apparatus of claim 17, wherein the apparatus is implemented on a mobile device on which the application is implemented and the apparatus communicates the generated control data to at least one transceiver of the mobile device.

20. The apparatus of claim 17, wherein the apparatus further assigns a channel of the plurality of channels to application data by accessing a database that includes a list of traffic types mapped to channels having frequency bands best suited for each listed traffic type.

* * * * *